US 11,872,596 B2

(12) United States Patent
Löfqvist et al.

(10) Patent No.: US 11,872,596 B2
(45) Date of Patent: Jan. 16, 2024

(54) OBJECT CONVEYING AND/OR SORTING SYSTEM

(71) Applicant: BOMILL AB, Vintrie (SE)

(72) Inventors: Bo Löfqvist, Lund (SE); Per Horvath, Hörby (SE); Karin Wehlin, Malmö (SE)

(73) Assignee: BOMILL AB, Vintrie (SE)

( * ) Notice: Subject to any disclaimer, the term of this patent is extended or adjusted under 35 U.S.C. 154(b) by 0 days.

(21) Appl. No.: 17/901,055

(22) Filed: Sep. 1, 2022

(65) Prior Publication Data

US 2022/0410217 A1    Dec. 29, 2022

Related U.S. Application Data

(63) Continuation of application No. 16/644,034, filed as application No. PCT/SE2018/050934 on Sep. 14, 2018, now abandoned.

(30) Foreign Application Priority Data

Sep. 14, 2017    (SE) .................... 1751115-5

(51) Int. Cl.
    *B07C 5/34*        (2006.01)
    *B07C 5/36*        (2006.01)
    (Continued)

(52) U.S. Cl.
    CPC ............ *B07C 5/365* (2013.01); *B07C 5/3422* (2013.01); *B65G 47/46* (2013.01); *B65G 47/525* (2013.01);
    (Continued)

(58) Field of Classification Search
    None
    See application file for complete search history.

(56) References Cited

U.S. PATENT DOCUMENTS

| 4,630,736 A | 12/1986 | Maughan et al. |
| 4,697,709 A | 10/1987 | Codding |

(Continued)

FOREIGN PATENT DOCUMENTS

| CA | 1242260 | 9/1998 |
| CN | 103501924 | 1/2014 |

(Continued)

OTHER PUBLICATIONS

International Search Report and Written Opinion dated Dec. 20, 2018 by the International Searching Authority for International Application No. PCT/SE2018/050934, filed on Sep. 14, 2018 and published as WO 2019/054932 dated Mar. 21, 2019 (Applicant-BOMILL AB) (11 Pages).

*Primary Examiner* — Joseph C Rodriguez
(74) *Attorney, Agent, or Firm* — Ballard Spahr LLP

(57) ABSTRACT

A method is disclosed for sorting a plurality of objects including an object that is one of a grain, a nut, a tree nut, or a bean. The plurality objects are conveyed along a guide plate having at least two channels between a first end and a second end of the corresponding channel. The channels have a first aperture provided at a first longitudinal position thereof and an additional aperture provided at a second longitudinal position on the guide plate located downstream of the first aperture. An optical measurement associated with a property of the object of the plurality of objects is conducted when the object passes the first aperture towards the second end with an object measurement unit. The object conveyed on the corresponding channel is ejected with an ejector unit when reaching the second longitudinal position based on the measured property of the object and a timing signal.

16 Claims, 3 Drawing Sheets

(51) Int. Cl.
*B07C 5/342* (2006.01)
*B65G 47/46* (2006.01)
*B65G 47/52* (2006.01)

(52) U.S. Cl.
CPC .. *B65G 2203/025* (2013.01); *B65G 2203/041* (2013.01)

(56) References Cited

U.S. PATENT DOCUMENTS

| | | |
|---|---|---|
| 4,718,558 A * | 1/1988 | Castaneda ............. B07C 5/3425 |
| | | 209/546 |
| 4,848,590 A | 7/1989 | Kelly |
| 5,819,373 A | 10/1998 | Schlichter et al. |
| 6,814,211 B2 | 11/2004 | Yunker et al. |
| 7,743,927 B2 | 6/2010 | Svatek et al. |
| 8,907,241 B2 | 12/2014 | Dell+3 Endice et al. |
| 10,099,259 B2 * | 10/2018 | Anup ........................ B07C 5/36 |
| 2007/0262002 A1 * | 11/2007 | Ito ........................ B07C 5/3425 |
| | | 209/580 |
| 2009/0050540 A1 | 2/2009 | Imai et al. |
| 2009/0200214 A1 | 8/2009 | Svatek et al. |

FOREIGN PATENT DOCUMENTS

| | | |
|---|---|---|
| EP | 0130715 | 1/1985 |
| EP | 0838273 | 4/1998 |
| EP | 0968772 | 1/2000 |
| EP | 1300200 | 4/2003 |
| GB | 2300480 | 11/1996 |
| JP | 10-128243 | 5/1998 |
| WO | WO 2004/060585 | 7/2004 |
| WO | WO2007/068697 | 6/2007 |

\* cited by examiner

OBJECT CONVEYING AND/OR SORTING SYSTEM

CROSS-REFERENCE TO RELATED APPLICATIONS

This application is a continuation of U.S. patent application Ser. No. 16/644,034, filed Mar. 3, 2020, which is a U.S. National Phase application of International Application No. PCT/SE2018/050934, filed Sep. 14, 2018, which claims priority to Swedish Application No. 1751115-5, filed Sep. 14, 2017, each of which is hereby incorporated by reference in its respective entirety.

TECHNICAL FIELD

The present invention concerns a system for conveying and ejecting particular objects of a bulk of objects. More particularly, the present invention pertains to a guide plate having at least one channel for conveying the objects, wherein each channel has a first aperture utilized for measuring a property of the object while being conveyed in the channel. At least one ejector unit is arranged to eject the object conveyed on the corresponding channel when reaching a position located downstream of the first aperture based on the measured property of the object and a timing signal corresponding to a conveying velocity of the object being conveyed along the channel.

BACKGROUND

It is known to sort objects within a bulk of objects, such as grains, by means of a rotating cylinder or drum, which cylinder has pockets on the inside. This cylinder is rotating around a substantially horizontal axis, while being aligned with its longitudinal central axis coinciding with said horizontal axis. The objects, such as granules, are fed into one end of the cylinder, and as the cylinder rotates the granules will be lifted as they are captured in the pockets. The pockets are adapted in size and dimensions for receiving one object each. In the bottom of each pocket an opening is provided into the outside surface of the drum, such that for example light may be sent outside the drum, through the openings, onto the objects, and being detected on the inside of the drum or reflected to be detected on the outside of the drum, or vice versa. In this way the object in the respective pocket may be illuminated with light, and reflection or transmission spectra may be obtained. From this spectra, characteristics of said objects may be obtained, which may be used to sort or fractionize said bulk of objects based on said characteristics. One or several collectors may then be placed in the vicinity of the drum, to receive after characterization a specified fraction based on impulses from a detector. A drum of this kind, and a machine comprising such drum, is disclosed in WO 2004/060585.

A problem associated with such a drum is that the opening may be occluded by the objects received therein, if the objects get stuck in the opening. Then this pocket will be useless for the rest of the fractionizing procedure, since the object being stuck not will be expelled into its corresponding through and no new object can enter the pocket during the next revolution of the drum. Another problem is that only a limited part of information from the object may be obtained, since the magnitude of information is governed by the size of the opening. A third problem is that pocket size must be customized after the object size in three dimensions, and the drum must thus be customized after the size of the object. Fourthly, in a drum there is a need for individual active ejection of each object.

Another known sorting solution is to allow a bulk stream of objects to drop over a ledge, similarly to a waterfall. A camera or a set of cameras detect properties of the objects during the object's fall, and an ejector unit is arranged to eject objects having certain detected properties in the fall. In this way the ejected objects are sorted out from the original bulk stream of objects. A downside of this solution is that it is rather imprecise, even with an optimized fluid jet stream, since for each ejection also several neighboring objects, e.g. up to 8 to 12 at full capacity, are ejected together with the object having the certain property. A majority of the ejected object may thus not have the certain property triggering the ejection, whereby the ejected group of objects has mixed properties. At the same time, many objects which should not have been ejected will be ejected by this method. This has a detrimental impact on the throughput of the system as well as the capability and degree of precisely sorting out objects having different properties, since for example only one fraction may be separated.

Hence, an improved system for sorting out objects would be advantageous.

SUMMARY

Accordingly, the present invention preferably seeks to mitigate, alleviate or eliminate one or more of the above-identified deficiencies in the art and disadvantages singly or in any combination and solves at least the above mentioned problems by providing an object conveying system comprising; a guide plate having at least one channel for conveying an object between a first end and a second end of the corresponding channel, wherein the at least one channel comprises a first aperture provided at a first longitudinal position thereof, an object measurement unit for conducting an optical measurement associated with a property of the object via the first aperture when the object passes the first aperture towards the second end, at least one ejector unit arranged to eject the object conveyed on the corresponding channel when reaching a second longitudinal position located downstream of the first aperture based on the measured property of the object and a timing signal associated with a conveying velocity of the object being conveyed along the channel.

Advantageous embodiments are envisioned in the dependent claims below.

BRIEF DESCRIPTION OF THE DRAWINGS

These and other aspects, features and advantages of which the invention is capable of will be apparent and elucidated from the following description of embodiments of the present invention, reference being made to the accompanying drawings, in which.

DESCRIPTION

The following description is dedicated to an object conveying system, used to sort out objects having certain measured properties from a bulk of objects. Such properties may for example be structure, purity, genomes as well as epigenetic properties of organic granules. Such objects may be organic or inorganic, such as e.g. grains, granules, lentils, nuts, tree nuts, beans, recyclables, minerals, metals, plastics, etc.

Figure 1:
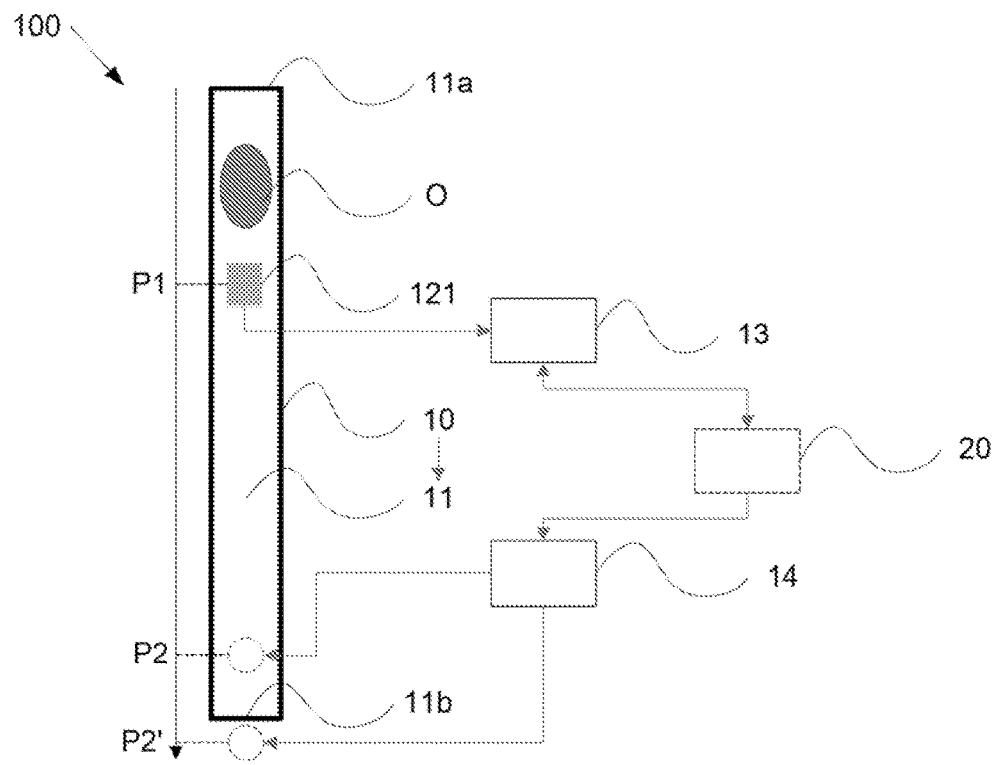
FIG. 1 is a top view of an object conveying system.

FIG. 1 shows a top view of an object conveying system 100. The object conveying system 100 comprises guide plate 10. The guide plate 10 has a longitudinal extension. The guide plate 10 has at least one channel 11 for conveying an object O between a first end 11 $a$ and second end 11 $b$ of the corresponding channel 11, as indicated by the black arrow. For simplicity FIG. 1 only shows one channel. However, it should be appreciated that any number of adjacently provided channels could be used. Hence, in one embodiment the guide plate 10 comprises a plurality of channels 11. Each channel 11 comprises a first aperture 121 provided at a first longitudinal position thereof P1. An object measurement unit 13 is provided to conduct an optical measurement associated with a property of an object via the first aperture 121 when said object passes the first aperture 121 towards the second end 11 $b$. The first aperture 121 may optionally be provided with a mesh, grid, or transparent material, such as glass, adapted not to interfere with the optical measurement over the object O, such that the aperture 121 not necessarily is adapted in size to the size of the object, which in turn gives the opportunity to measure in the axial plane over the entire length of the object O. Also, the first aperture 121 may be arranged transversally of a multitude of channels 11, and optionally even interrupting the channels 11 over a certain detection gap. The first aperture 121, arranged transversally of a multitude of channels 11, may be combined with a mesh or grid. At least one ejector unit 14 is arranged to eject the object conveyed on the corresponding channel 11 when reaching a corresponding second longitudinal position P2, P2' located downstream of the first aperture 121 based on the measured property of the object and a timing signal corresponding to a conveying velocity, i.e. the relevant velocity for the movement of the object O towards its corresponding ejector unit 14, of the object being conveyed along the channel 11. When more than one fraction is to be separated from the bulk of objects, each channel 11 may be provided with more than one position P2, such as 2, 3, 4, or 5 positions P2, each position P2 having its corresponding ejector unit 14 to separate a corresponding fraction, based on at least one property of the object O.

The second longitudinal position P2 may either be provided within the boundaries of each channel, as indicated by P2 in FIG. 1, or be provided downstream the second end 11 $b$ of the channel. The two second longitudinal positions P2, P2' should be seen as two different alternatives although shown simultaneously in FIGS. 1 and 2 using dashed lines.

The timing signal may be arranged to activate any one of the corresponding ejector units, such as eject the corresponding object having the property being measured. In order to achieve this it is important to know when said object will pass said second longitudinal position P2, P2' such as to activate corresponding ejector unit at the correct time to eject the object when the corresponding object reaches the second longitudinal position. The timing signal is thus corresponding to the conveying velocity of the object between the first aperture and the second longitudinal position. The time instant at which an ejector unit should be activated may be calculated in different ways.

Figure 2:
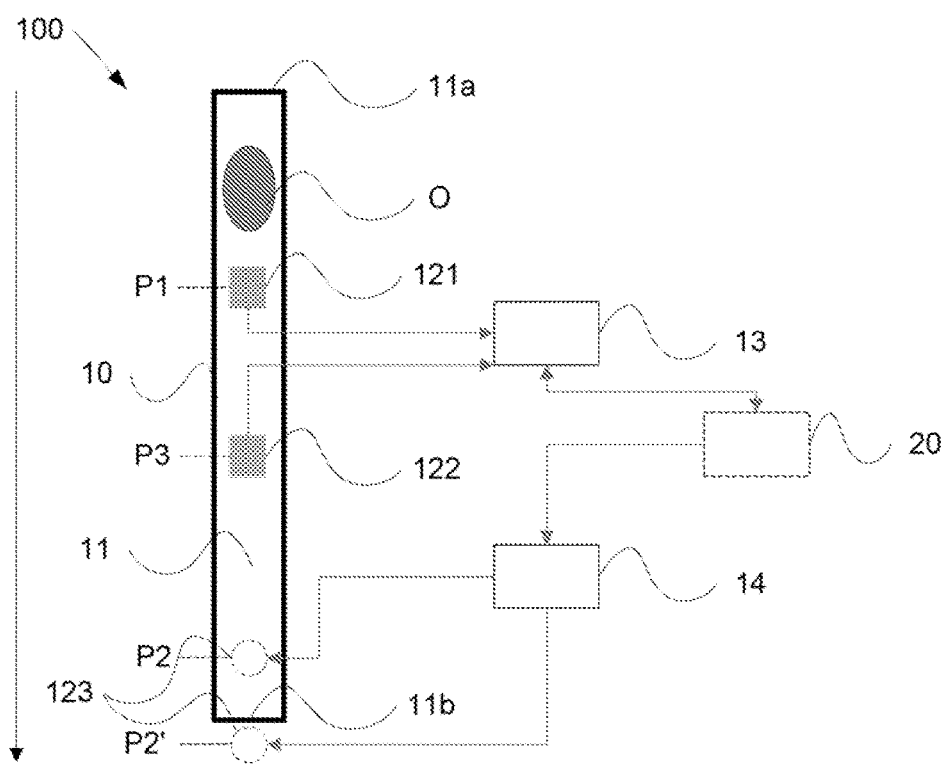
FIG. 2 is a top view of the object conveying system of FIG. 1 being provided with a second aperture.
Figure 3:
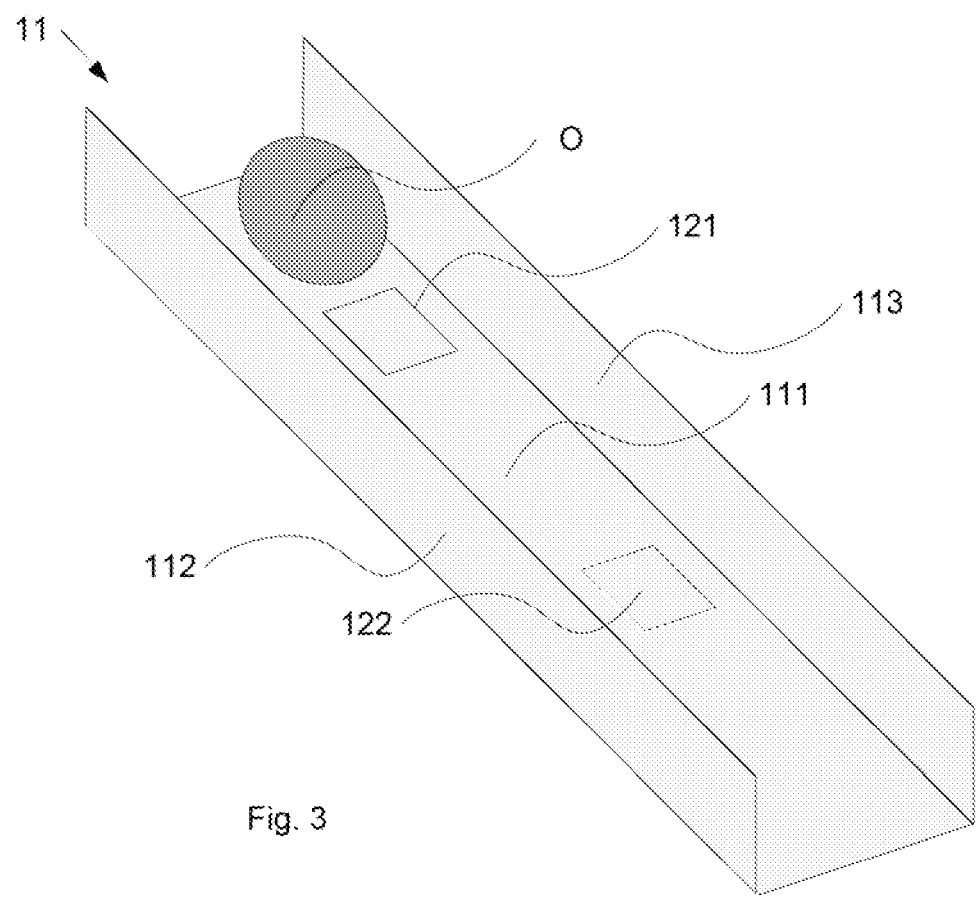
FIG. 3 is a perspective view of a channel of the object conveying system of FIG. 1 or 2.
Figure 4:
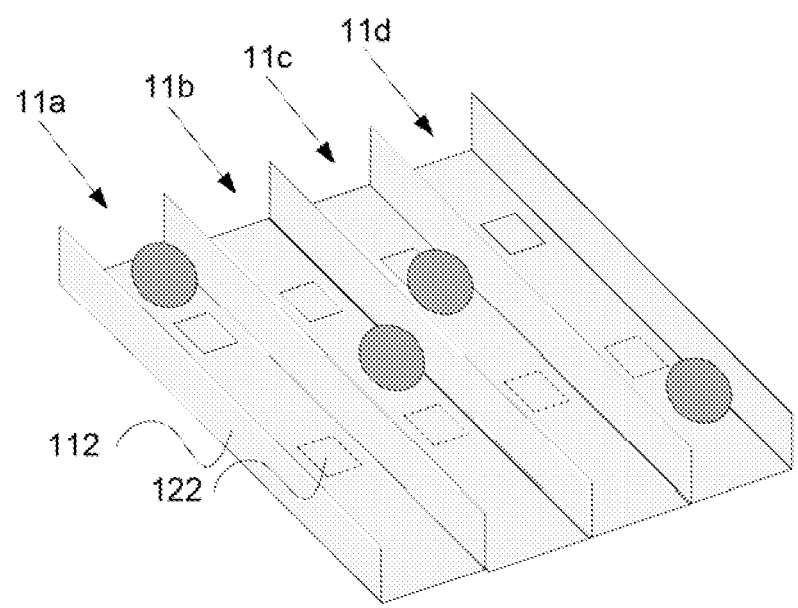
FIG. 4 is a perspective view of the object conveying system of FIG. 1 or 2 wherein the guide plate contains a number of adjacently extending channels.

To this end, in accordance with FIG. 2, at least one second aperture 122 may be provided at a third longitudinal position P3 arranged downstream the first longitudinal position P1, but upstream the second longitudinal position P2, P2'. The second aperture 122 is operatively coupled to the object measurement unit 13, such as to allow for calculation of the conveying velocity. There may be several second apertures 122, instead of only one, through which combined information may be used to calculate the velocity.

Here, the object measurement unit 13 may be arranged to optically detect the object O passing the first aperture 121 at an associated first time instant T1, and the object O passing the second aperture 122 at an associated second time instant T2. The conveying velocity of the object may then be calculated as the distance between the first longitudinal position P1 and the third longitudinal position P3 divided by the time duration between the second time instant and the first time instant.

Hence using the commonly known relationship between speed, distance and time, s=v*t;

$$v=(P3-P1)/(T2-T1)$$

The time TACT at which the object will pass the second longitudinal position may thus be calculated using the same formula as t=(TACT−T1)=s/v=(P2−P1)/v=((P2−P1)(T2−T1)/P3−P1)->TACT=((P2−P1)(T2−T1)/P3−P1)+T1.

Accordingly, the timing of the timing signal is dependent on the TACT for its corresponding fraction to be separated.

Alternatively or in combination the conveying velocity could be calculated by using measurements only from the first aperture. Here, the object measurement unit 13 is arranged to optically detect the object O entering the first aperture 121 at an associated first time instant T1', and the object exiting the first aperture 121 at an associated second time instant T2'. Similarly to the above, using the formula s=v*t, the conveying velocity of the object may be calculated utilizing a time duration, defined by the difference between the second time instant T2' and the first time instant T1', and a known size of the first aperture 121. Here it should be appreciated that the object measurement unit could detect the first time instant T1' when the front end of the object enters the upstream end of the first aperture and the second time instant T2' when the front end of the object reaches the downstream end of the first aperture. In stead of calculation of velocity and/or acceleration of the objects a camera could be used to continuously follow the longitudinal change in position of the objects and give an appropriate signal for its ejection, or in similar ways determine the proper time of ejection.

The third longitudinal position P3 may optionally be the same as the first longitudinal position P1, such that the velocity is calculated through the same aperture as an optical measurement associated with a property of an object is calculated.

As seen with reference to FIGS. 3 to 6, each channel 11 may comprise a longitudinally extending base 111 and a pair of sidewalls 112, 113 arranged along either lateral side of the base 111 for limiting the movement of the object O in a lateral direction when being conveyed longitudinally along the base 111. This lateral confinement drastically improves the calculation of TACT and moreover, aligns the respective object to the downstream second longitudinal position at which the object will optionally be ejected. As indicated in FIGS. 2 to 6 the first aperture 121 and/or second aperture 122 may be provided straight through the base 111.

In order to further reduce the risk of ejecting unwanted objects accidentally being in the neighborhood of the object to be ejected having the measured property, the channels may be provided in different lengths. Hence, a first channel 11 *a* of the guide plate 10 may have a first length and a second channel 11 *b* of the guide plate 10 may have a second length differing from the first length, as shown with reference to FIGS. 5 and 6.

Figure 5:
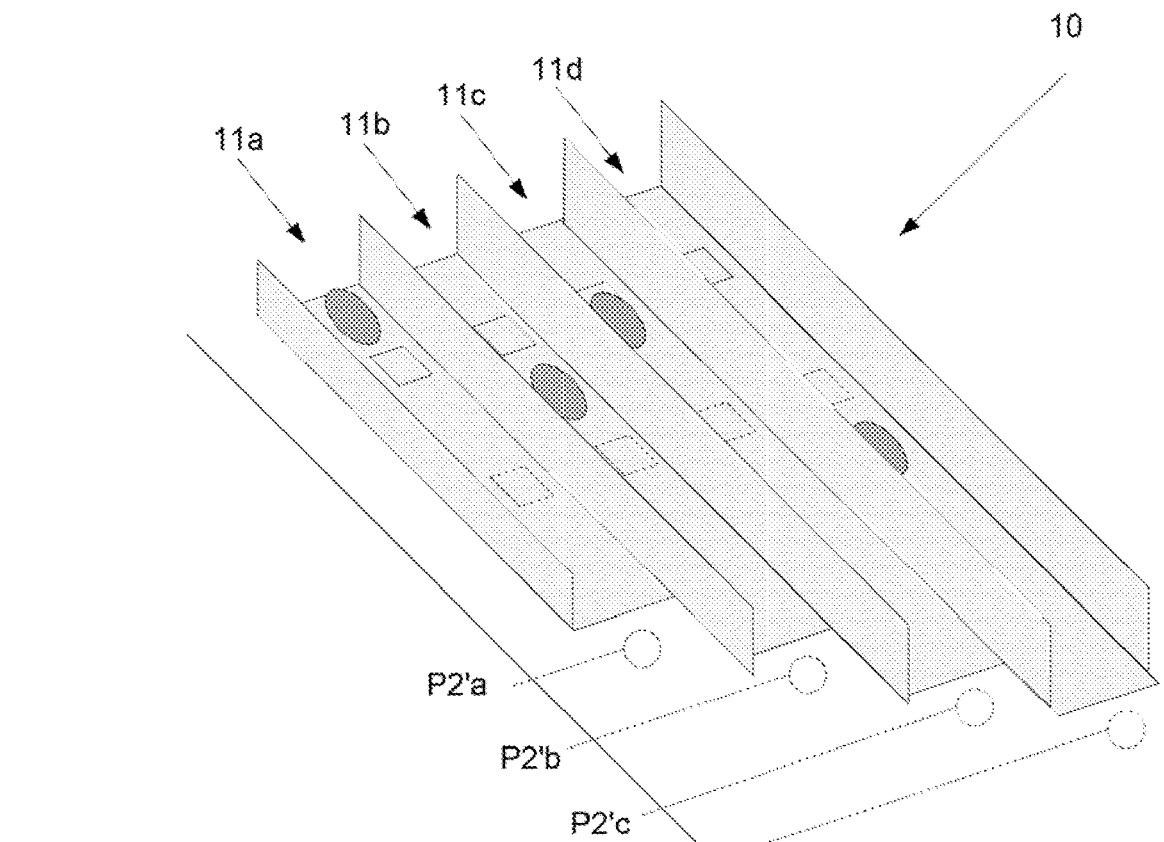
FIG. 5 is a perspective view of the object conveying system of FIG. 1 or 2 wherein the guide plate contains a number of adjacently extending channels each having a different length, and where the eject position is located downstream the end of each channel.
Figure 6:
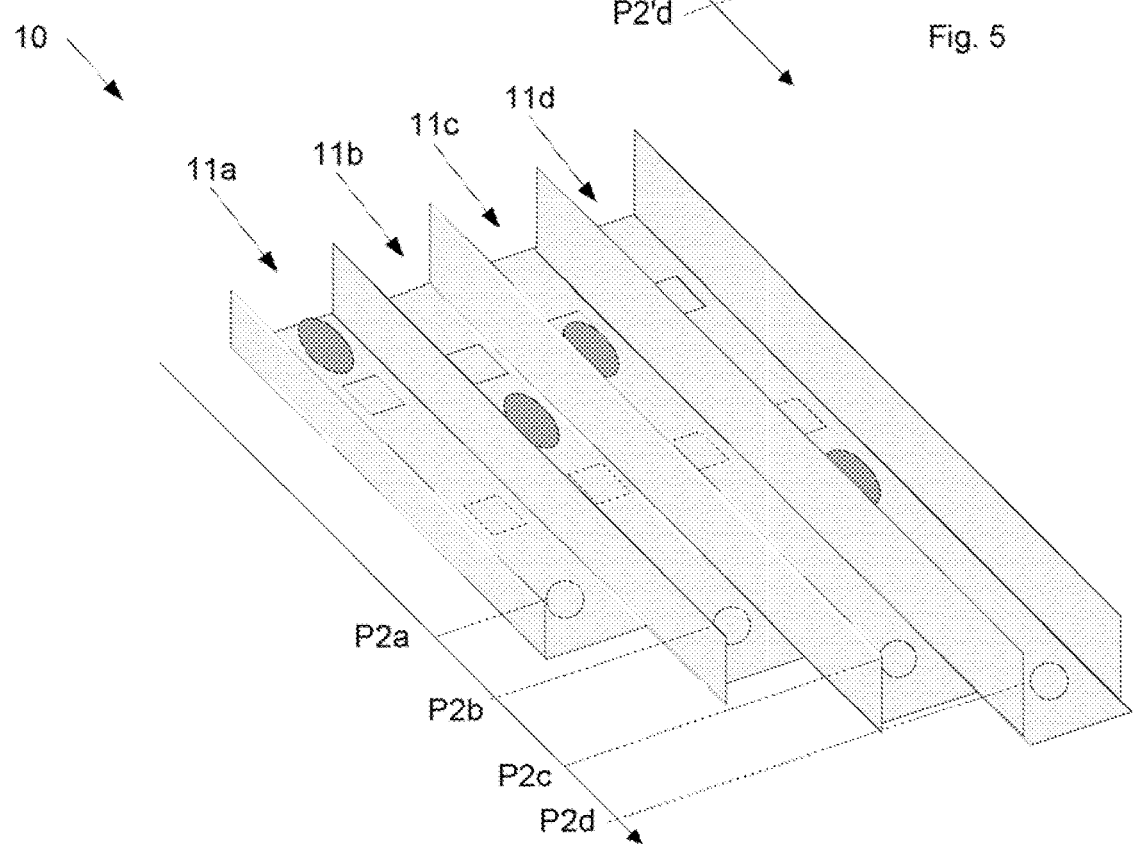
FIG. 6 is a perspective view of the object conveying system of FIG. 1 or 2 wherein the guide plate contains a number of adjacently extending channels each having a different length, and where the eject position for each channel is located upstream the end of each channel.

This means that a second longitudinal position P2 *a*, P2'*a* of a first channel 11 *a* of the guide plate 10 may be provided downstream or upstream a second longitudinal position P2 *b*, P2'*b* of a second channel 11 *b* of the guide plate 10, as shown in FIGS. 5 and 6.

At the location of the second longitudinal position P2, P2' a third aperture 123 may be arranged for receiving a fluid jet stream. The third aperture 123 may be located within the boundaries of the channels 11. This means that each channel 11 has a separate third aperture 123. In this way the fluid jet stream may focus on each object O to be ejected. As mentioned above, the second longitudinal position P2' may be located downstream the second end 11 *b* of each channel as shown in FIG. 5, or it could be arranged upstream the second end 11 *b* of each channel as shown in FIG. 6.

Although not shown, the third aperture 123 may be tapered thus forming an ejection channel having a cross-section reducing through the base 111 of the guide plate 10 towards the object in use.

Depending on the circumstances it may be advantageous to provide the second longitudinal position upstream the second end of the channel, as close downstream to an optional second aperture as possible, or as close to the first aperture as possible if a second aperture is not provided, since this reduces the risk for the object to be subject to a change of velocity after the velocity is calculated, thereby improving the calculation of the time instant TACT defining when the object passes over the second longitudinal position.

The timing signal could be adjusted to be sent before time TACT to compensate for optional lag in the ejector unit such as the jet stream hits the second longitudinal position exactly at TACT.

Each channel 11 may have a width dimensioned to accommodate a single object.

Although the channels in the drawings have a rectangular shape, other shapes are also possible. For example, the side walls 112, 113 need not be parallel, so as to self-center the object O in the channel 11. In such case, at least one of the side walls 112, 113, such as both side walls 112, 113, are inclined in relation to a vertical, in use, or in relation to a general normal to the guide plate 10. For example, each channel may be V-shaped, in a transversal cross-section, wherein the junction of the side walls 112, 113 at the bottom forms the base 111 and the side walls 112, 113 are inclined. In a V-shaped channel there may be a reduced risk of an object being stuck in the channel upon being conveyed as well as the object being self centering regardless of size whilst also the longitudinal alignment of the object O in the channel 10 is improved. Also, each channel may for example be U-shaped in a transversal cross-section. In other alternatives, each channel has an independent shape, being the same or different from other channels in the guide plate 10. For example, one channel may be V-shaped, whilst other channels are U-shaped or rectangular in shape. Also the longitudinal extension of the channel 11 may vary in direction, such as comprising curves in the lateral or vertical direction of the channel 11. These differences in direction may affect and control the relevant velocity of the object O. The differences in direction may result in the channel(s) O comprising an S-shape in the horizontal and/or vertical plane.

The ejector unit 14 may be a fluid jet stream unit, an electromagnetically activated membrane, or piezoelectric punch/thrust.

The object conveying system 100 may comprise a control unit 20 operatively coupled to the ejector unit 14 and/or object measurement unit 13. Hence, the control unit may be arranged to activate each ejector unit 14 based on the timing signal being associated with the calculated time TACT for each object that has been positively identified to have the property measured by the object measurement unit 13. Accordingly, the control unit 20 may be arranged to eject a particular object based on information of said object being obtained from the object measuring unit 13.

The control unit 20 may further be arranged to receive information from at least one object sensor 21 (not shown) monitoring each object between the first longitudinal position P1 and the second longitudinal position P2, P2', thereby assuring that the object having a certain property to be ejected is ejected at the second longitudinal position P2, P2' by means of the ejector unit 14. The sensor 21 may be a camera. Alternatively, the sensor may be arranged to detect the speed of each object being conveyed along each channel. Hence, the ejecting time TACT may thus be calculated by the control unit based on a conveying velocity derived from said sensor 21.

The following is claimed:

1. A method for sorting a plurality of objects comprising an object that is one of a grain, a nut, a tree nut, or a bean, the method comprising:
    conveying the plurality objects along a guide plate having at least two channels between a first end and a second end of the corresponding channels, wherein the at least two channels each comprise a first aperture provided at a first longitudinal position thereof and an additional aperture provided at a second longitudinal position on the guide plate located downstream of the first aperture;
    conducting an optical measurement associated with a property of the object of the plurality of objects via the first aperture when the object passes the first aperture towards the second end with an object measurement unit; and
    ejecting the object, with at least one ejector unit, conveyed on the corresponding channel when reaching the second longitudinal position based on the measured property of the object and a timing signal associated with a conveying velocity of the object being conveyed along the channel,
    wherein the at least two channels comprise a longitudinally extending base and a pair of sidewalls arranged along the base for limiting the movement of the object in a lateral direction when being conveyed longitudinally along the base, and wherein the additional aperture is configured to receive a fluid jet stream,
    wherein conducting the optical measurement associated with the property of the object via the first aperture when the object passes the first aperture towards the second end with the object measurement unit comprises:

optically detecting the object entering the first aperture at an associated first time instant and calculating a time at which the object will pass the second longitudinal position by using measurements only from the first aperture.

2. The method according to claim 1, wherein calculating the time at which the object will pass the second longitudinal position by using measurements only from the first aperture comprises:

calculating the time at which the object will pass the second longitudinal position by utilizing the first time instant, the second time instant, the size of the first aperture, and a distance between the first longitudinal position and second longitudinal position.

3. The method according to claim 1, wherein the first aperture and/or additional aperture is provided through the longitudinally extending base.

4. The method according to claim 1, wherein the at least two channels comprise a first channel and a second channel that each extend along a longitudinal dimension, wherein the first channel of the guide plate has a first length along the longitudinal dimension and the second channel of the guide plate has a second length along the longitudinal dimension differing from the first length.

5. The method according to claim 1, wherein the at least two channels comprise a first channel and a second channel that each extend along a longitudinal dimension, wherein the second longitudinal position of the first channel of the guide plate is spaced from the second longitudinal position of the second channel of the guide plate along the longitudinal dimension.

6. The method according to claim 1, wherein each channel of the at least two channels has a width dimensioned to accommodate a single object.

7. The method according to claim 1, wherein the ejector unit is a fluid jet stream unit.

8. The method of claim 1, wherein the additional aperture is tapered, thus forming an ejection channel having a cross-section reducing through the base of the guide plate towards an upper surface of the base.

9. The method according to claim 1, wherein a control unit is arranged to control the operation of the ejector unit and/or object measurement unit.

10. The method according to claim 9, wherein the control unit is further arranged to eject a particular object based on information of said object being obtained from the object measuring unit.

11. The method according to claim 9, wherein the control unit is further arranged to receive information from at least one object sensor monitoring each object between the first longitudinal position and the second longitudinal position, thereby assuring that the object having a certain property to be ejected is ejected at the second longitudinal position by means of the ejector unit.

12. The method according to claim 11, wherein the at least one object sensor comprises at least one camera.

13. The method of claim 1, wherein the object is a grain.

14. The method of claim 1, wherein conveying the plurality objects along the guide plate comprises guiding, by the pair of sidewalls, each object of the plurality of objects within each channel in single file.

15. A method for sorting a plurality of objects comprising an object that is one of a grain, a nut, a tree nut, or a bean, the method comprising:

conveying the plurality objects along a guide plate having at least two channels between a first end and a second end of the corresponding channels, wherein the at least two channels each comprise a first aperture provided at a first longitudinal position thereof and an additional aperture;

conducting an optical measurement associated with a property of the object of the plurality of objects via the first aperture when the object passes the first aperture towards the second end with an object measurement unit; and ejecting the object, with at least one ejector unit provided at a second longitudinal position on the guide plate located downstream of the first aperture, conveyed on the corresponding channel when reaching the second longitudinal position based on the measured property of the object and a timing signal associated with a conveying velocity of the object being conveyed along the channel, wherein the at least two channels comprise a longitudinally extending base and a pair of sidewalls arranged along the base for limiting the movement of the object in a lateral direction when being conveyed longitudinally along the base, wherein the at least one ejector unit is configured to provide a fluid jet stream at the second longitudinal position wherein conducting the optical measurement associated with the property of the object via the first aperture when the object passes the first aperture towards the second end with the object measurement unit comprises:

optically detecting the object entering the first aperture at an associated first time instant and calculating a time at which the object will pass the second longitudinal position by using measurements only from the first aperture.

16. The method according to claim 15, wherein the second longitudinal position is located downstream of the second end of each channel of the at least two channels.

* * * * *